United States Patent
Xie

(10) Patent No.: US 10,021,688 B2
(45) Date of Patent: Jul. 10, 2018

(54) MANAGING PENDING ACKNOWLEDGEMENT PACKETS IN A COMMUNICATION DEVICE

(71) Applicant: Apple Inc., Cupertino, CA (US)

(72) Inventor: Tao Xie, Beijing (CN)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 15/033,062

(22) PCT Filed: Jun. 7, 2013

(86) PCT No.: PCT/CN2013/076929
§ 371 (c)(1),
(2) Date: Apr. 28, 2016

(87) PCT Pub. No.: WO2014/194515
PCT Pub. Date: Dec. 11, 2014

(65) Prior Publication Data
US 2016/0302197 A1    Oct. 13, 2016

(51) Int. Cl.
H04W 72/04     (2009.01)
H04L 12/64     (2006.01)
H04L 5/00      (2006.01)
H04L 12/18     (2006.01)
H04W 72/12     (2009.01)
H04W 88/02     (2009.01)

(52) U.S. Cl.
CPC ....... *H04W 72/0446* (2013.01); *H04L 5/0055* (2013.01); *H04L 12/18* (2013.01);
(Continued)

(58) Field of Classification Search
CPC .. H04M 15/8214; H04M 15/85; H04M 15/61; H04M 15/8228; H04M 15/00;
(Continued)

(56) References Cited

U.S. PATENT DOCUMENTS 5,961,605 A    10/1999    Deng et al.
6,215,769 B1   4/2001     Ghani et al.
(Continued)

FOREIGN PATENT DOCUMENTS

| CN | 1344456 A | 4/2002 |
| CN | 102970118 A | 3/2013 |
| WO | WO2012051963 A1 | 4/2012 |

OTHER PUBLICATIONS

PCT Application No. PCT/CN2013/076929—International Search Report and Written Opinion dated Feb. 27, 2014.
(Continued)

*Primary Examiner* — Thai Nguyen
(74) *Attorney, Agent, or Firm* — Dickinson Wright RLLP

(57) ABSTRACT

A method for managing pending acknowledgement (ACK) packets in a communication device is provided. The method can include the communication device monitoring a status of a transmit queue for packets to be sent over a network; detecting a queue condition indicative of congestion causing a delay in sending one or more ACK packets pending in the transmit queue; and discarding a set of one or more ACK packets from the transmit queue in response to the queue condition. The discarded set of one or more ACK packets can include one or more oldest ACK packets of the ACK packets pending in the transmit queue. A most recent ACK packet pending in the transmit queue can remain pending in the transmit queue after the set of one or more ACK packets has been discarded.

20 Claims, 7 Drawing Sheets

(52) U.S. Cl.
CPC ..... *H04L 12/6418* (2013.01); *H04W 72/1278* (2013.01); *H04W 88/02* (2013.01)

(58) Field of Classification Search
CPC ..... H04W 76/023; H04W 12/04; H04W 4/24; H04L 12/1403; H04L 63/00; H04L 12/1435; H04L 12/1439
See application file for complete search history.

(56) References Cited

U.S. PATENT DOCUMENTS

| | | | | |
|---|---|---|---|---|
| 7,315,515 | B2 * | 1/2008 | Pazos | H04L 1/1607 370/231 |
| 2007/0104129 | A1 * | 5/2007 | Yang | H04L 1/0003 370/329 |
| 2013/0250765 | A1 * | 9/2013 | Ehsan | H04L 47/193 370/235 |
| 2013/0250767 | A1 | 9/2013 | Zhong et al. | |

OTHER PUBLICATIONS

Chinese Application for Invention No. 201380077184.5—First Office Action dated Feb. 2, 2018.
Balakrishnan et al., "The effects of asymmetry on TCP performance", Computer Science Division, Department of EECS, University of California at Berkeley, Berkeley, CA 94720-1776, USA; Mobile Networks and Applications 4(1999) 219-241—23 pages.

* cited by examiner

TPC Header

| Offsets | Octet | 0 | | | | | | | | 1 | | | | | | | | 2 | | | | | | | | 3 | | | | | | |
|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source port ||||||||||||||| Destination port |||||||||||||||||
| 4 | 32 | Sequence number |||||||||||||||||||||||||||||||
| 8 | 64 | Acknowledgment number (if ACK set) |||||||||||||||||||||||||||||||
| 12 | 96 | Data offset | | | | Reserved 0 0 0 | | | | N S | C W R | E C E | U R G | A C K | P S H | R S T | S Y N | F I N | Window Size ||||||||||||||||
| 16 | 128 | Checksum ||||||||||||||| Urgent pointer (if URG set) |||||||||||||||||
| 20 | 160 | Options (if Data Offset >5, padded at the end with "0" bytes if necessary) |||||||||||||||||||||||||||||||
| ... | ... | ... |||||||||||||||||||||||||||||||

*FIG. 2*

| ACK1 402 | ACK2 404 | ACK3 406 | ACK4 408 | |

*FIG. 4A*

| ACK3 406 | ACK4 408 | | |

MANAGING PENDING ACKNOWLEDGEMENT PACKETS IN A COMMUNICATION DEVICE

CROSS REFERENCE TO RELATED APPLICATIONS

This application is a national stage application under 35 U.S.C. § 371 claiming priority to PCT Application No. PCT/CN2013/076929, filed Jun. 7, 2013, which is incorporated by reference herein in its entirety for all purposes.

FIELD OF THE DESCRIBED EMBODIMENTS

The described embodiments relate generally to communications technology, and more particularly to managing pending acknowledgement (ACK) packets in a communication device.

BACKGROUND

When two computing devices engage in communication over a network, a first device can send data to a second device. The second device can acknowledge successful receipt of data sent by the first device by sending one or more ACK packets to the first device. For example, devices and networks implementing certain transport layer protocols, such as transmission control protocol (TCP), can use ACK packets as a flow control mechanism. In this regard, a device sending a series of data packets to a second device can be allowed to send up to a predefined maximum number of unacknowledged data packets to the second device before receiving an ACK packet acknowledging successful receipt of a sent unacknowledged data packet. If the sending device sending the series of data packets has sent the maximum number of unacknowledged data packets, the sending device has to discontinue sending further sequential packets in the series of data packets and/or resend one or more previously sent data packets until receiving an ACK from the second device. As such, if there is a delay in the second device sending an ACK packet to acknowledge receipt of a data packet sent by the sending device, the throughput and round trip time (RTT) for the communication session with the sending device can be reduced, as sending of data packets by the sending device can be stalled.

In many cases, the bandwidth available for sending data in one direction on a network is not the same as for data sent in the other direction. For example, in many cellular communications systems, available downlink (DL) bandwidth is often significantly greater than available uplink (UL) bandwidth, as the volume of data downloaded from the network by a mobile terminal can be much greater than the volume of data uploaded to the network by the mobile terminal. However, sometimes UL bandwidth is not even sufficient to allow transmission of TCP ACK packets. This situation can be exacerbated if a device is uploading data to the network while sending TCP ACK packets to acknowledge data received on the DL. As a result of this congestion on the UL, the RTT for TCP service can be increased, and the DL throughput can be impacted, as the sending of data packets on the DL can be stalled due to delayed transmission of TCP ACK packets.

SUMMARY OF THE DESCRIBED EMBODIMENTS

Some example embodiments disclosed herein provide for managing pending ACK packets in a communication device. More particularly, a communication device in accordance with some example embodiments can be configured to discard one or more oldest ACK packets pending in a transmit queue in response to a congestion condition. In this regard, usage of bandwidth for sending older ACK packets in a congestion condition can be avoided in accordance with such embodiments, as a more recent pending ACK packet cumulatively acknowledging receipt of packets acknowledged by the discarded packets can be sent without waiting to send the pending ACK packets that have been discarded. Accordingly, RTT can be decreased and throughput for a communication session can be increased from reduced delay in acknowledging receipt of data.

In a first embodiment, a wireless communication device is provided. The wireless communication device of the first embodiment can include a communication interface and processing circuitry coupled to the communication interface. The communication interface can be configured to send data on an uplink to a cellular network and to receive data on a downlink from the cellular network. The processing circuitry of the first embodiment can be configured to control the wireless communication device to at least: monitor a status of a transmit queue for packets to be sent on the uplink; detect a queue condition indicative of uplink congestion causing a delay in sending one or more TCP ACK packets of a plurality of TCP ACK packets pending in the transmit queue; and discard a set of one or more TCP ACK packets of the plurality of TCP ACK packets from the transmit queue in response to the queue condition. The discarded set of one or more TCP ACK packets can include one or more oldest TCP ACK packets of the plurality of TCP ACK packets pending in the transmit queue. A most recent TCP ACK packet of the plurality of TCP ACK packets pending in the transmit queue can remain pending in the transmit queue after the set of one or more TCP ACK packets has been discarded.

In a second embodiment, a method for managing pending ACK packets in a communication device is provided. The method of the second embodiment can include the communication device: monitoring a status of a transmit queue for packets to be sent over a network; detecting a queue condition indicative of congestion causing a delay in sending one or more ACK packets of a plurality of ACK packets pending in the transmit queue; and discarding a set of one or more ACK packets of the plurality of ACK packets from the transmit queue in response to the queue condition. The discarded set of one or more ACK packets can include one or more oldest ACK packets of the plurality of ACK packets pending in the transmit queue. A most recent ACK packet of the plurality of ACK packets pending in the transmit queue can remain pending in the transmit queue after the set of one or more ACK packets has been discarded.

In a third embodiment, a computer program product for managing pending ACK packets in a communication device is provided. The computer program product of the third embodiment can include at least one non-transitory computer readable storage medium having program code stored thereon. The program code of the third embodiment can include program code for monitoring a status of a transmit queue for packets to be sent over a network; program code for detecting a queue condition indicative of congestion causing a delay in sending one or more ACK packets of a plurality of ACK packets pending in the transmit queue; and program code for discarding a set of one or more ACK packets of the plurality of ACK packets from the transmit queue in response to the queue condition. The discarded set of one or more ACK packets can include one or more oldest ACK packets of the plurality of ACK packets pending in the transmit queue. A most recent ACK packet of the plurality of ACK packets pending in the transmit queue can remain pending in the transmit queue after the set of one or more ACK packets has been discarded.

In a fourth embodiment, an apparatus for managing pending ACK packets is provided. The apparatus of the fourth embodiment can include means for monitoring a status of a transmit queue for packets to be sent over a network; means for detecting a queue condition indicative of congestion causing a delay in sending one or more ACK packets of a plurality of ACK packets pending in the transmit queue; and means for discarding a set of one or more ACK packets of the plurality of ACK packets from the transmit queue in response to the queue condition. The discarded set of one or more ACK packets can include one or more oldest ACK packets of the plurality of ACK packets pending in the transmit queue. A most recent ACK packet of the plurality of ACK packets pending in the transmit queue can remain pending in the transmit queue after the set of one or more ACK packets has been discarded.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

FIG. 2 illustrates an example TCP ACK packet format.

FIGS. 4A and 4B illustrate management of pending ACK packets in a transmit queue in accordance with some example embodiments.

DETAILED DESCRIPTION OF SELECTED EMBODIMENTS

In many communication systems, a device receiving data can acknowledge receipt of data by sending ACK packets to the sending device. If, however, there is a delay in sending an ACK packet, such as can occur in congestion conditions, the sending of additional data by the sending device can be stalled while the sending device waits to receive an ACK packet in an instance in which the sending device has sent a maximum allowable number of unacknowledged data packets. As such, the delay in sending ACK packets that can result from congestion conditions can result in an undesirable increase in RTT decrease in throughput.

Some example embodiments disclosed herein provide systems, methods, apparatuses, and computer program products for management of pending ACK packets in a communication device, which can increase throughput and decrease RTT in a communication session in the event of congestion conditions resulting in delay in sending ACK packets pending in a transmit queue. More particularly, some example embodiments can be configured to discard one or more oldest ACK packets pending in a transmit queue in response to a congestion condition. In this regard, usage of bandwidth for sending older ACK packets in a congestion condition can be avoided in accordance with such embodiments, as a more recent pending ACK packet cumulatively acknowledging receipt of packets acknowledged by the discarded packets can be sent without waiting to send the pending ACK packets that have been discarded. Accordingly, RTT can be decreased and throughput for a communication session can be increased from reduced delay in acknowledging receipt of data in the event of congestion conditions.

Figure 1:
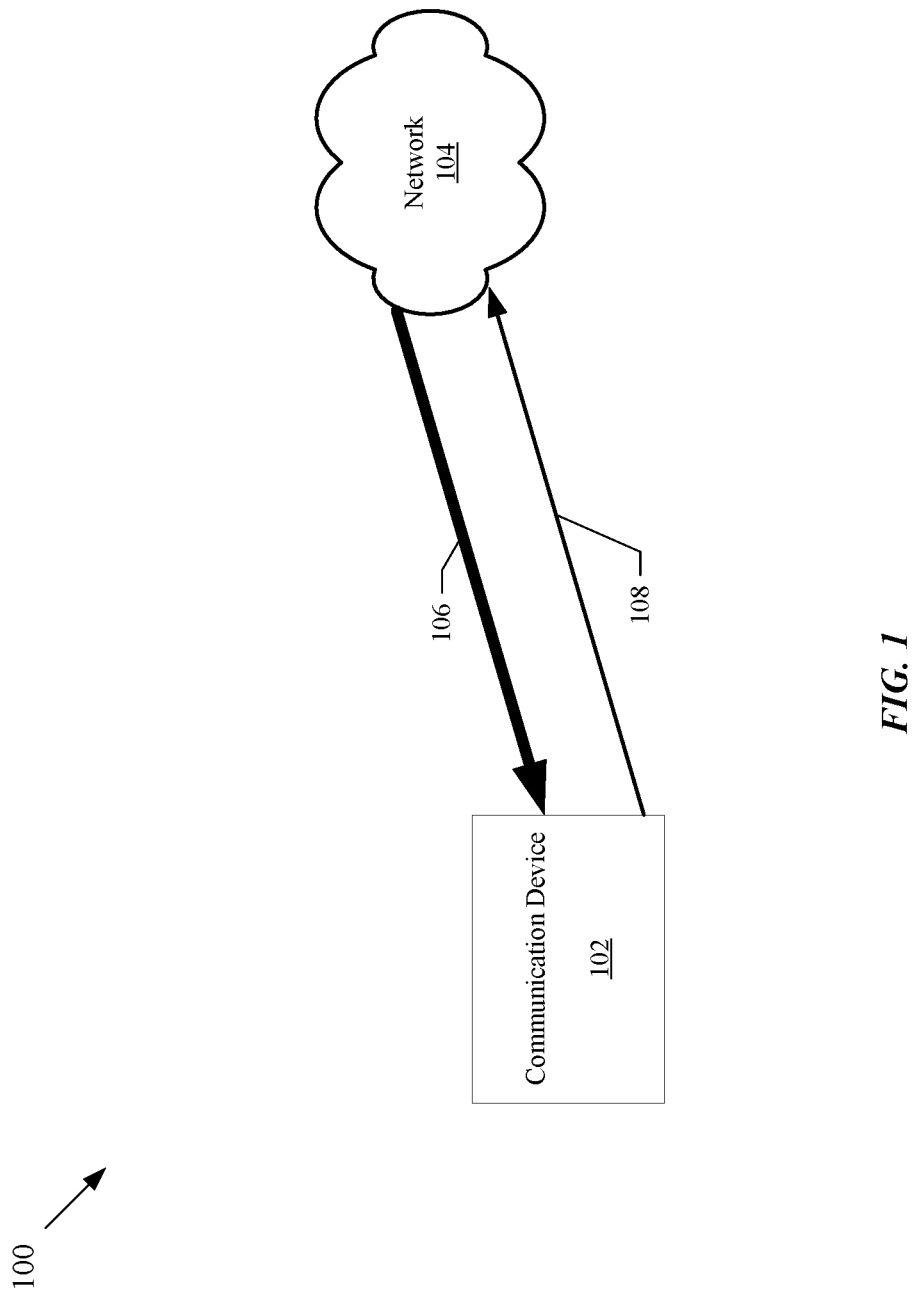
FIG. 1 illustrates a communication system in accordance with some example embodiments.

FIG. 1 illustrates a communication system 100 in accordance with some example embodiments. The system 100 can include a communication device 102, which can be connected to a network 104. The communication device 102 can be embodied as any computing device that can be configured to connect to and communicate over a network, such as a wireline network, wireless network, some combination thereof, or the like. By way of non-limiting example, the communication device 102 can be embodied as a wireless communication device (e.g., a mobile terminal, cellular phone, smart phone, tablet computing device, laptop computer, desktop computer, and/or other computing device that can include a wireless communication interface configured to support communication over a wireless network), a laptop computer, desktop computer, server, a network-capable television, a network-capable audio/video receiver, networked appliance, and/or any other device that can be configured to connect to and engage in communication over a network.

The network 104 can be embodied as any network that can support communication between two networked-connected devices, such as the communication device 102. The network 104 can, for example, be embodied as a wireline network (e.g., an Ethernet network, wired local area network, fiber network, wireline network that can be maintained by a telephone/cable service provider, some combination thereof, or the like), a wireless network (e.g., a cellular network, wireless local area network, wireless wide area network, some combination thereof, or the like), or a combination thereof, and in some example embodiments may comprise the Internet.

As such, it will be appreciated that the communication device 102 can be connected to the network 104 via any of a variety of links and/or access networks. For example, in embodiments in which the communication device 102 is embodied as a wireless communication device and the network 104 includes a wireless access network, the communication device 102 can, for example, be connected to the network 104 via a cellular base station, a wireless local area network access point, and/or other wireless network access point. As a further example, in embodiments in which the communication device 102 is connected to the network 104 via a wired connection, the communication device 102 can, for example, be connected to the network 104 via an Ethernet connection, phone line, cable, and/or other wireline interface that can be used to connect a communication device to a network.

The communication device 102 can send data to and receive data from the network 104 via the connection between the communication device 102 and the network 104. The exchanged data can, for example be exchanged over the network 104 in support of a communication system between the communication device 102 and another network connected device that can be accessible via the network 104.

In some example embodiments, the communication device 102 can receive (e.g., download) data from the network 104, as illustrated by reference 106. The received data can, for example, be segmented into packets that can be sent over a packet switched network. For example, the data can be sent using a transport layer protocol, such as TCP. The communication device 102 can be configured to acknowledge successful receipt of the data by sending acknowledgments (e.g., ACK packets) to the network 104, as illustrated by reference 108. In some example embodiments in which the received data is segmented into packets, the acknowledgements can acknowledge receipt of particular packets. For example, data packets can be identifiable by sequence number and/or other identifier that can be unique within a sequence of packets that can be received by the communication device 102 in a communication session, and an ACK can indicate successful receipt of one or more such packets by indicating one or more successfully received packet data packet sequence numbers (and/or other identifier that can be used to identify data packets).

In accordance with some example embodiments, the communication device 102 can be configured to generate an ACK packet in response to receipt of a data packet(s). The communication device 102 can be further configured to add the ACK packet to a transmit queue that can be maintained by the communication device 102 for packets to be sent to the network 104. An ACK packet can remain pending in the transmit queue (e.g., in line behind any previously added and/or any packets that can have a higher priority) until its turn to be sent, at which point the ACK packet can be removed from the transmit queue and sent to the network 104.

In embodiments in which TCP is used, ACK packets that can be generated and sent by the communication device 102 can be TCP ACK packets, which can, for example, be formatted in accordance with the example TCP ACK packet format illustrated in FIG. 2. The TCP ACK packet can be used to acknowledge successful receipt of data t the receiving side without any payload. The control information in the TCP ACK packet header can be time sensitive. It will be appreciated, however, that references in the instant disclosure to TCP are provided by way of example, and not by way of limitation. In this regard, where examples are discussed with respect to TCP, other transport layer protocols and/or other appropriate non-transport layer communication protocols can be used in addition to or in lieu of TCP within the scope of the disclosure. Thus, it will be appreciated that data can be sent to and received by the communication device 102 using protocols in addition to or in lieu of TCP in accordance with some example embodiments. Likewise, the communication device 102 can acknowledge receipt of data using ACK packets that can be used in protocols other than TCP in such example embodiments. Accordingly, it will be appreciated that embodiments described with respect to TCP can be applied mutatis mutandis to other protocols that can use ACK packets for controlling flow of a network communication session.

In some example embodiments, such as some embodiments using TCP, a flow control mechanism can be implemented such that the network 104 and/or a device communicating with the communication device 102 via the network 104 can be allowed to send up to a maximum amount of data (e.g., a maximum number of packets) to the communication device 102 before receiving an acknowledgement for at least a portion of the sent data. In some instances a connection between the communication device 102 and network 104 can be congested such that one or more ACK packets that can be pending in a transmit queue of the communication device 102 can be delayed. Delayed acknowledgement of received data by the communication device 102 in such congestion conditions can accordingly delay the sending of further data to the communication device 102.

As a more particular example scenario, in some example embodiments in which the communication device 102 is embodied as a wireless communication device and is connected to a wireless access network, the bandwidth that can be available on the DL can be greater than bandwidth that can be available on the UL. Such a scenario can be particularly common in some cellular networks using radio access technologies (RATs), such as Time Division Synchronous Code Division Multiple Access (TD-SCDMA) and Enhanced Data rates for Global System for Mobile Communications (GSM) Evolution (EDGE). For example, as High Speed Uplink Packet Access (HSUPA) is not deployed in TD-SCDMA live networks, the maximum UL data rate can be limited to 128 kilobits per second (kbps), while the DL can support data rates up to 1.5 megabits per second (Mbps). Thus, while the communication device 102 may be able to receive a relatively large volume of data on the DL, the limited UL bandwidth can result in congestion conditions that can delay transmission of an ACK packet by the communication device 102.

As will be described further herein below, the communication device 102 of some example embodiments can be configured to monitor the status of a transmit queue to detect a queue condition indicative of congestion, such as, UL congestion in a wireless network, congestion in a wireline network, and/or other congestion in a network connection, that can cause delay in sending one or more ACK packets that can be pending in the transmit queue. In response to detecting such a queue condition, the communication device 102 of some such example embodiments can be configured to discard one or more oldest ACK packets pending in the transmit queue. At least a most recent ACK packet can, however be left pending in the transmit queue to be sent to the network 104 to acknowledge received data. In this regard, the ACK packet(s) that remain pending in the transmit queue after discarding one or more oldest ACK packets in accordance with such example embodiments can be understood by the network 104 and/or a network connected device that can receive the ACK packet(s) to cumulatively acknowledge receipt of the data (e.g., each data packet) that was acknowledged by the one or more discarded ACK packets. Accordingly, discarding the one or more oldest ACK packets can reduce the amount of pending data to be sent in congestion conditions, while still providing for acknowledgement of all successfully received data such that communication of further data to the communication device 102 can be continued and/or resumed more quickly even in congestion conditions, thus reducing RTT and improving throughput for the communication session.

Figure 3:
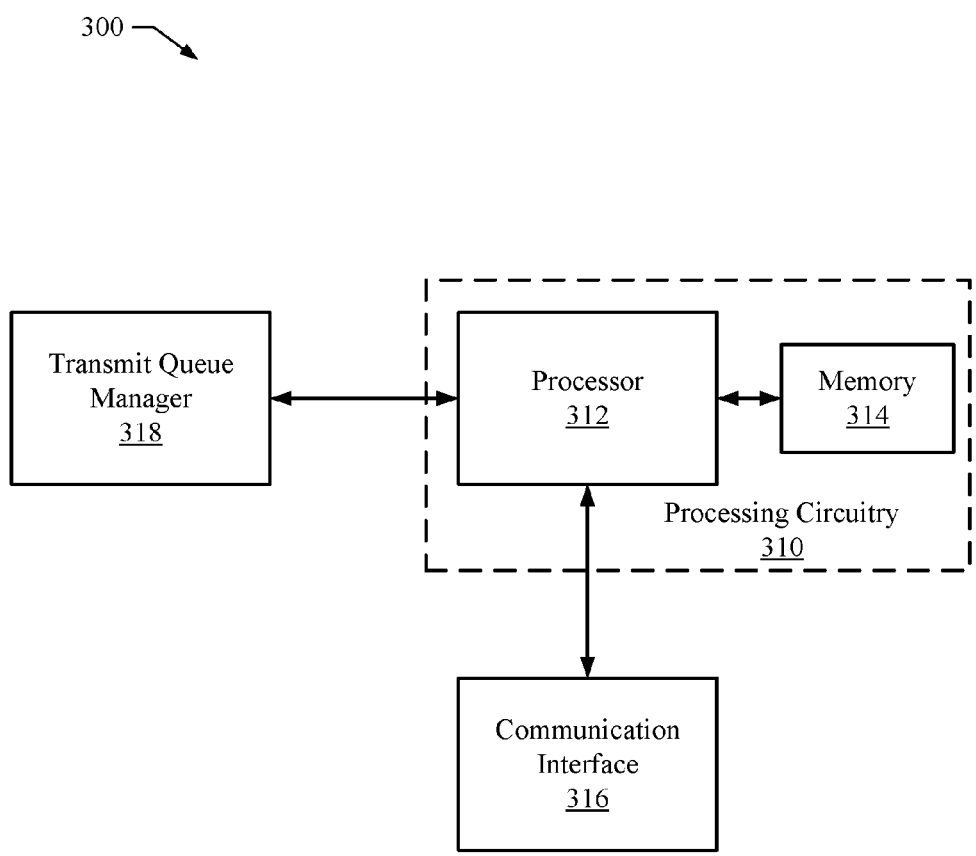
FIG. 3 illustrates a block diagram of an apparatus that can be implemented on a communication device in accordance with some example embodiments.

FIG. 3 illustrates a block diagram of an apparatus 300 that can be implemented on a communication device 102, in accordance with some example embodiments. In this regard, when implemented on a computing device, such as communication device 102, apparatus 300 can enable the computing device to manage pending ACK packets in a communication device in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the apparatus 300 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a chipset. In some example embodiments in which one or more components of the apparatus 300 are embodied as a chipset, the chipset can be capable of enabling a computing device to operate in the system 100 when implemented on or otherwise operably coupled to the computing device.

In some example embodiments, the processing circuitry 310 can include a processor 312 and, in some embodiments, such as that illustrated in FIG. 3, can further include memory 314. The processing circuitry 310 can be in communication with or otherwise control a communication interface 316 and/or transmit queue manager 318.

The processor 312 can be embodied in a variety of forms. For example, the processor 312 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 and/or of the communication device 102 as described herein. In some example embodiments, the processor 312 can be configured to execute instructions that can be stored in the memory 314 or that can be otherwise accessible to the processor 312. For example, in some example embodiments, the processor 312 can be embodied as a general purpose computing processor that can be coupled to the memory 314, such as via a bus, and can be configured to perform operations in accordance with one or more example embodiments through execution of instructions that can be stored in the memory 314. As such, whether configured by hardware or by a combination of hardware and software, the processor 312 capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, communication interface 316, or transmit queue manager 318 via a bus (or buses) for passing information among components of the apparatus 300.

The apparatus 300 can further include a communication interface 316. The communication interface 316 can be configured to support a connection between the apparatus 300 and the network 104. In this regard, the communication interface 316 can include one or more interface mechanisms for enabling communication with other devices and/or networks. For example, the communication interface 316 can include an antenna (or multiple antennas) and supporting hardware and/or software for enabling communications with a wireless communication network (e.g., a cellular network, Wi-Fi, WLAN, and/or the like) and/or a communication modem or other hardware/software for supporting communication via cable, digital subscriber line (DSL), USB, FireWire, Ethernet or other wireline networking methods. In some example embodiments, the communication interface 316 can accordingly be configured to send data to and/or receive data from one or more remote devices and/or networks, such as the network 104.

The apparatus 300 can further include transmit queue manager 318. The transmit queue manager 318 can be embodied as various means, such as circuitry, hardware, a computer program product comprising computer readable program instructions stored on a computer readable medium (for example, the memory 314) and executed by a processing device (for example, the processor 312), or some combination thereof. In some embodiments, the processor 312 (or the processing circuitry 310) can include, or otherwise control the transmit queue manager 318.

As previously described, the communication device 102 can be configured to generate ACK packets in response to successful receipt of data from the network 104 and can add the ACK packets to a transmit queue that can be maintained by the communication device 102 for pending packets waiting to be sent to the network 104. Thus, for example, an ACK packet, such as a TCP ACK packet, can be generated and added to the transmit queue in response to successful receipt of one or more data packets.

The transmit queue manager 318 of some example embodiments can be configured to monitor a status of the transmit queue for occurrence of a queue condition indicative of congestion, such as, by way of non-limiting example, UL congestion in an instance in which a connection to the network 104 is a wireless connection, that can cause a delay in sending one or more ACK packets that can be pending in the transmit queue. The transmit queue manager 318 can be configured to use any of a variety of techniques, alone or in combination, to detect occurrence of such a queue condition indicative of congestion.

For example, in some example embodiments, a predefined threshold limit on a number of ACK packets that can be pending in the transmit queue can be set. The transmit queue 318 can accordingly be configured to monitor a number of ACK packets pending in the transmit queue and, if the number of pending ACK packets reaches the predefined threshold limit, the transmit queue manager 318 can be configured to detect occurrence of a queue condition indicative of congestion causing a delay in sending one or more pending ACK packets in the transmit queue. The threshold limit can be set to any number depending on implementation. In some example embodiments, the threshold limit can, by way of non-limiting example, be set to 3.

As another example, in some embodiments, the transmit queue manager 318 can be configured to maintain a timer for each of one or more ACK packets pending in the transmit queue. In this regard, the transmit queue manager 318 can set a timer in response to an ACK packet being added to the transmit queue. If the timer expires before the ACK packet for which the timer is maintained is sent by the communication device 102, the transmit queue manager 318 can be configured to detect occurrence of a queue condition indicative of congestion causing a delay in sending one or more pending ACK packets in the transmit queue. The timer value can be set to any value depending on implementation. In some example embodiments, a timer can be set for each ACK packet added to the transmit queue. Alternatively, in some example embodiments, a timer can be set for a subset of ACK packets added to the transmit queue.

It will be appreciated that the transmit queue manager 318 can be configured to use a timer(s) in addition to or in lieu of a threshold limit on a number of ACK packets pending in the transmit queue for detection of queue condition indicative of congestion causing a delay in sending one or more pending ACK packets in the transmit queue in accordance with some example embodiments. Moreover, it will be appreciated that the transmit queue manager 318 can be configured to use one or more further techniques in addition to or in lieu of a timer(s) and/or a threshold limit on a number of ACK packets pending in the transmit queue for detection of queue condition indicative of congestion causing a delay in sending one or more pending ACK packets in the transmit queue in accordance with some example embodiments.

The transmit queue manager 318 can be further configured to discard a set of one or more ACK packets from the transmit queue in response to detection of a queue condition indicative of congestion causing a delay in sending one or more pending ACK packets. The discarded set of one or more ACK packets can include one or more oldest ACK packets pending in the transmit queue. At least one most recent ACK packet can remain pending in the transmit queue after the set of one or more ACK packets has been discarded. Thus, the set of one or more discarded ACK packets can be a proper subset of the ACK packets that can be pending in the transmit queue when a queue condition indicative of congestion is detected.

For example, in some embodiments, ACK packets can be identifiable by a time stamp value, such as can indicate a time at which the ACK packet was generated and/or added to the transmit queue. Thus, in accordance with some example embodiments, one or more ACK packets having the oldest time stamp values can be discarded while a pending ACK packet having the most recent time stamp value can remain pending in the transmit queue.

As a further example, ACK packets can be identifiable by a corresponding data packet sequence number which is acknowledged by a respective ACK packet. Thus, an oldest ACK packet(s) pending in the transmit queue can be identifiable as acknowledging a corresponding oldest (e.g., earliest received) data packet of those data packets acknowledged by the ACK packets in the transmit queue at a given time.

As still a further example, in some example embodiments, the oldest ACK packet(s) can be identified based on a structure of the transmit queue. For example, in some example embodiments, the transmit queue can be a first-in-first-out (FIFO) queue. As such, the oldest ACK packet can be the ACK packet that is first in the queue amongst the ACK packets in the queue at a given time.

It will be appreciated that any number of ACK packets can be discarded so long as at least one ACK packet remains pending. As a non-limiting example, in some example embodiments in which a threshold limit of a number of ACK packets that can be pending in the transmit queue is defined, the n oldest ACK packets can be discarded, with n being a number of ACK packets sufficient to reduce the total number of ACK packets pending in the transmit queue to a number that is less than the threshold limit.

As another example, in some example embodiments, every pending ACK packet with the exception of the most recent m pending ACK packet can be discarded. In embodiments in which m most recent pending ACK packets are left in the transmit queue following discarding one or more ACK packets, m can be any defined number (e.g., 1 or more) packets, and can vary by implementation. For example, in some embodiments, m can be a number of packets (e.g., 2 or more) defined to provide redundancy in case an ACK packet is lost in transmission. For example, in some example embodiments, 3 ACK packets can be left in the transmit queue to allow the communication device 102 to send 3 ACKs for fast retransmission and to provide for more robustness in case one or more ACK packets are lost in transmission.

The at least one ACK packet that remains pending in the transmit queue after discarding an ACK packet(s) can cumulatively be understood by the network 104 and/or a device receiving the ACK packet (e.g., a sender of the data being acknowledged by the communication device 102) to acknowledge receipt of the data acknowledged by the discarded ACK packet(s). For example, in some example embodiments, if ACK packets collectively acknowledging receipt of data packet sequence numbers [1 . . . n−1] are discarded from the transmit queue and an ACK packet acknowledging receipt of data packet sequence number n is left in the transmit queue and is ultimately sent by the communication device 102, the sent ACK packet acknowledging receipt of data packet sequence number n can be understood by an entity receiving the ACK packet to acknowledge receipt of data packet sequence numbers [1 . . . n]. As another example, in some example embodiments, an ACK packet can include an explicit acknowledgement of each data packet in a sequence of data packets that has been successfully received at a time. Thus, an ACK packet generated for data packet sequence number n can explicitly acknowledge receipt each of data packet sequence numbers [1 . . . n] (assuming each of said data packets has been successfully received). Accordingly, in such example embodiments, if an ACK packet(s) generated in response to receipt of any of data packet sequence numbers [1 . . . n−1]

is discarded in response to congestion, the ACK packet generated in response to receipt of for data packet sequence number n can serve to acknowledge receipt of the preceding data packets.

FIGS. 4A and 4B illustrate management of pending ACK packets in a transmit queue in accordance with some example embodiments. In the example of FIG. 4A, the transmit queue can contain ACK1 402, ACK2 404, ACK3 406, and ACK4 408, with ACK1 402 being the oldest ACK packet and ACK4 being the most recent ACK packet, respectively. In response to detecting a queue condition indicative of congestion delaying sending one or ore ACK packets in the transmit queue illustrated in FIG. 4A, the transmit queue manager 318 can be configured to discard one or more oldest ACK packets (e.g., one or more of ACK1 402, ACK2 404, and ACK3 406). For example if each ACK packet with the exception of the two most recent ACK packets (e.g., ACK3 406 and ACK4 408) is discarded, the transmit queue can be left with only ACK3 406 and ACK4 408 pending, as illustrated in FIG. 4B. ACK3 406 can be understood by an entity receiving the ACK packet to implicitly or explicitly acknowledge receipt of all data acknowledged by discarded ACK packets ACK1 402 and ACK2 404. ACK4 408 can be understood by an entity receiving the ACK packet to implicitly or explicitly acknowledge receipt of all data acknowledged by discarded ACK packets ACK1 402, ACK2 404, and ACK3 406, and can further provide redundancy in case ACK3 406 is lost in transmission.

In some example embodiments, the transmit queue manager 318 can be configured to manage pending ACK packets on a per link (e.g., a per TCP link) basis. In some example embodiments, a separate transmit queue can be maintained for each respective link. In such example embodiments, the transmit queue manager 318 can monitor each respective transmit queue for a queue condition indicative of congestion, and can separately mange ACK packets pending in the transmit queues. Additionally or alternatively, in some example embodiments, a common transmit queue can be used for two or more links and the transmit queue manager 318 can be configured to separately manage pending ACK packets for the links associated with a common transmit queue. Thus, for example, if a queue condition indicative of congestion is detected, the transmit queue manager 318 can be configured to leave at least one ACK packet for each respective link pending in the common transmit queue after discarding one or more ACK packets in response to the queue condition.

Figure 5:
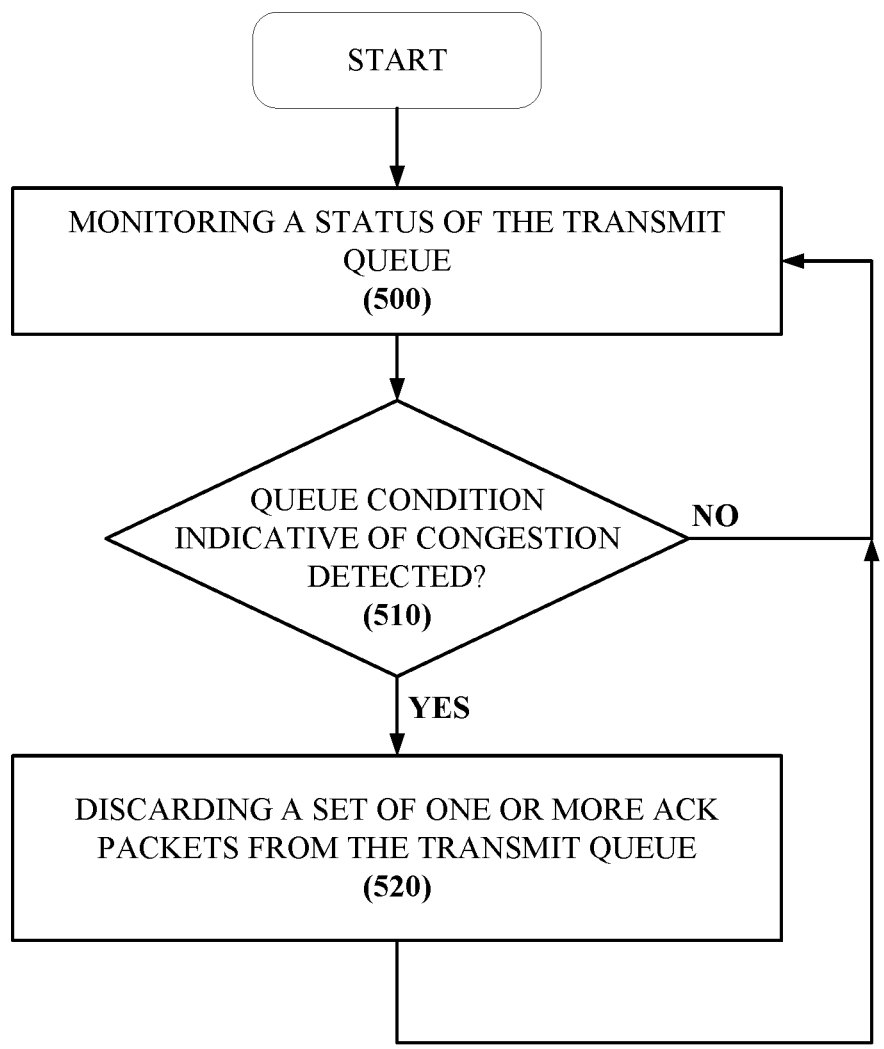
FIG. 5 illustrates a flow chart according to an example method for managing pending ACK packets in accordance with some example embodiments.
Figure 6:
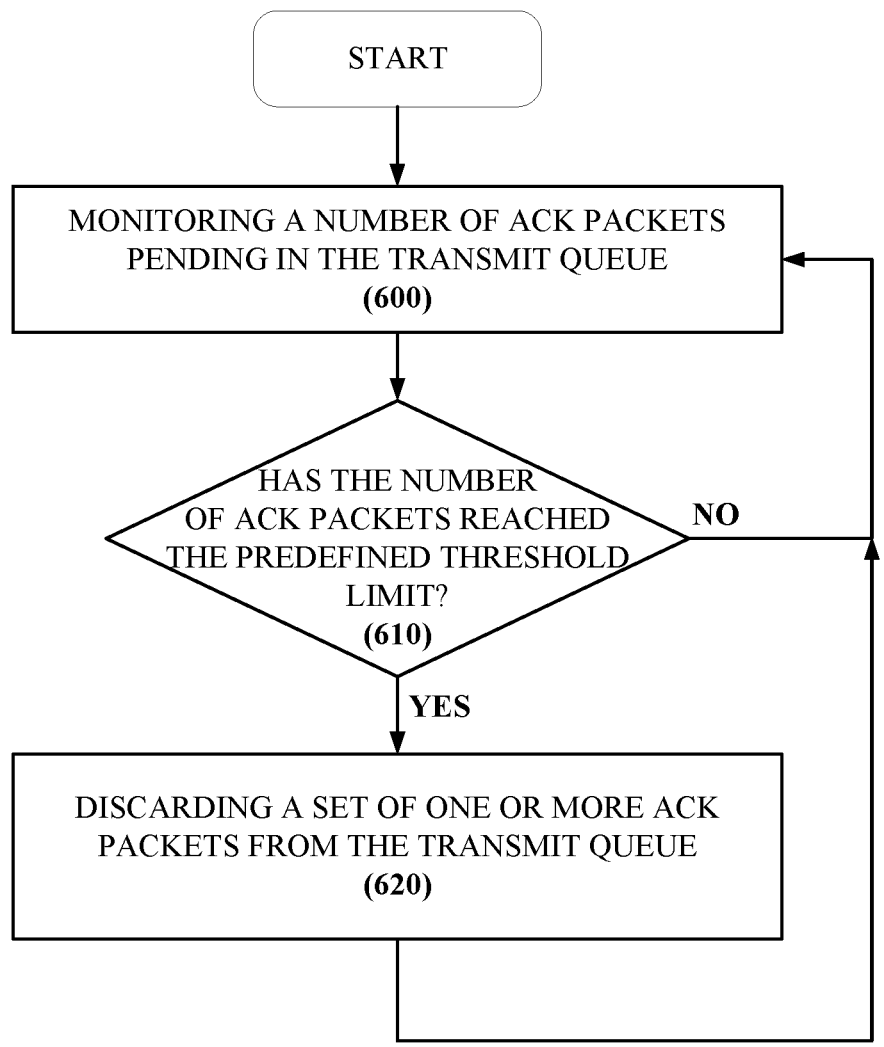
FIG. 6 illustrates a flow chart according to another example method for managing pending ACK packets in accordance with some example embodiments.

FIG. 5 illustrates a flow chart according to an example method for managing pending ACK packets in accordance with some example embodiments. In this regard, FIG. 6 illustrates operations that can be performed by the communication device 102. One or more of processing circuitry 310, processor 312, memory 314, communication interface 316, or transmit queue manager 318 can, for example, provide means for performing the operations illustrated in and described with respect to FIG. 5.

Operation 500 can include the communication device 102 monitoring a status of the transmit queue. At operation 510, the communication device 102 can determine if a queue condition indicative of congestion delaying sending one or more ACK packets pending in the transmit queue has been detected. If such a queue condition has not been detected, the communication device 102 can return to operation 500 and continue monitoring the status of the transmit queue. If, however, a queue condition indicative of congestion is detected in operation 510, the method can proceed to operation 520, which can include the communication device 102 discarding a set of one or more ACK packets from the transmit queue. The discarded set of one or more ACK packets can include one or more oldest ACK packets of the plurality of ACK packets pending in the transmit queue. A most recent ACK packet of the plurality of ACK packets that were pending in the transmit queue can remain pending in the transmit queue after performance of operation 520.

Subsequent to performance of operation 520, the method can return to operation 500 in accordance with some example embodiments. In this regard, monitoring of the transmit queue for conditions indicative of congestion can, for example, continue for a duration of a communication session in which the communication device 102 is sending ACK packets to acknowledge receipt of data.

FIG. 6 illustrates a flow chart according to another example method for managing pending ACK packets in accordance with some example embodiments. More particularly, FIG. 6 illustrates an embodiment of the method of FIG. 5 in which a threshold limit on a number of ACK packets that can be pending in the transmit queue can be defined and used to monitor the status of the transmit queue to detect congestion. One or more of processing circuitry 310, processor 312, memory 314, communication interface 316, or transmit queue manager 318 can, for example, provide means for performing the operations illustrated in and described with respect to FIG. 6.

Operation 600 can include the communication device 102 monitoring a number of ACK packets pending in the transmit queue. In this regard, operation 600 can correspond to an embodiment of operation 500.

Operation 610 can include the communication device 102 determining if the number of ACK packets pending in the transmit queue has reached the predefined threshold limit. In this regard, operation 610 can correspond to an embodiment of 510 in which the number of ACK packets pending in the transmit queue can be used to determine whether congestion delaying sending one or more ACK packets exists. If the number of ACK packets pending in the transmit queue has not reached the predefined limit, the communication device 102 can return to operation 600 and continue monitoring the number of ACK packets pending in the transmit queue.

If, however, it is determined in operation 610, that the number of ACK packets pending in the transmit queue has reached the predefined threshold limit, the method can proceed to operation 620, which can include the communication device 102 discarding a set of one or more ACK packets from the transmit queue. The discarded set of one or more ACK packets can include one or more oldest ACK packets of the plurality of ACK packets pending in the transmit queue. A most recent ACK packet of the plurality of ACK packets that were pending in the transmit queue can remain pending in the transmit queue after performance of operation 620.

Subsequent to performance of operation 620, the method can return to operation 600 in accordance with some example embodiments. In this regard, monitoring of the transmit queue for conditions indicative of congestion can, for example, continue for a duration of a communication session in which the communication device 102 is sending ACK packets to acknowledge receipt of data.

Figure 7:
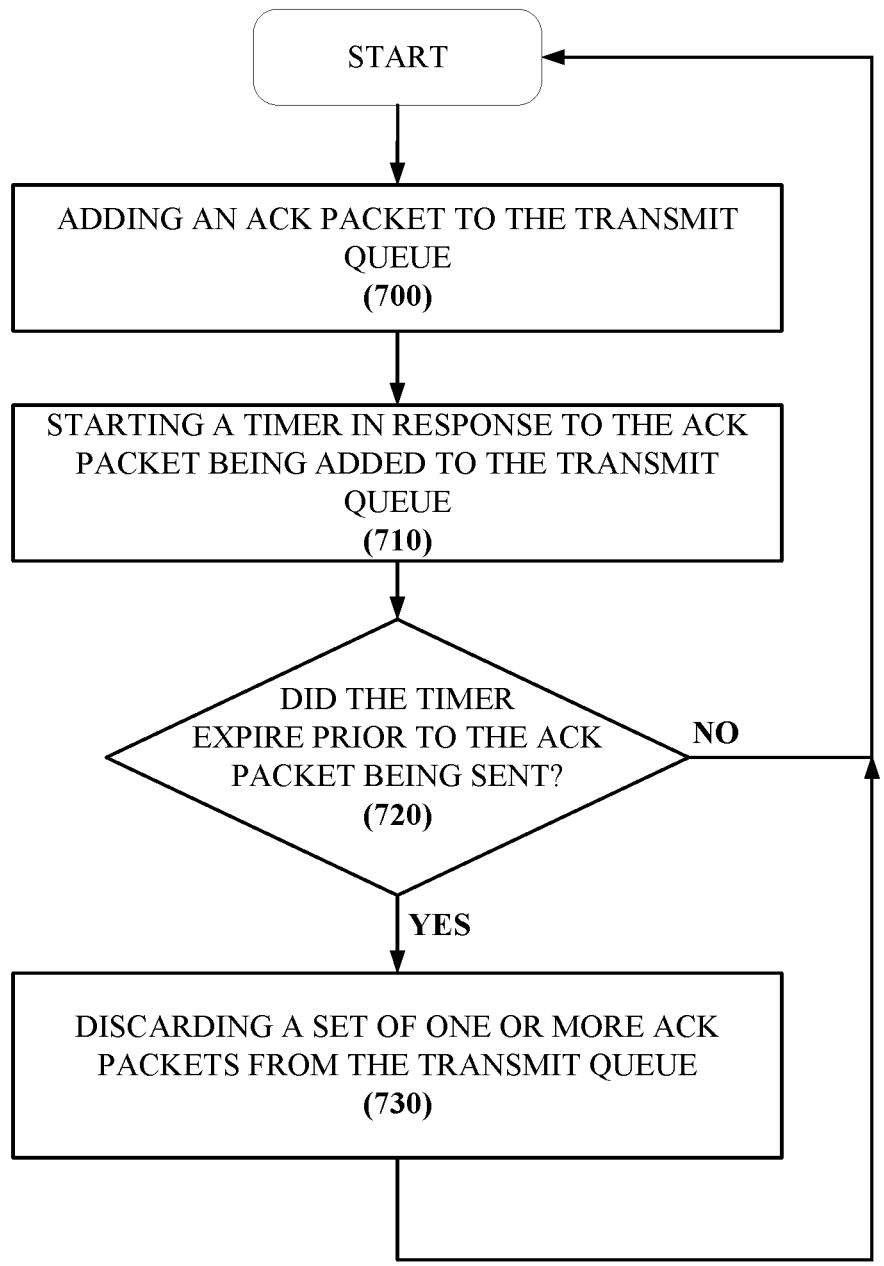
FIG. 7 illustrates a flow chart according to a further example method for managing pending ACK packets in accordance with some example embodiments.

FIG. 7 illustrates a flow chart according to a further example method for managing pending ACK packets in accordance with some example embodiments. More particularly, FIG. 7 illustrates an embodiment of the method of FIG. 5 in which one or more timers can be set and used to monitor the status of the transmit queue to detect congestion. One or more of processing circuitry 310, processor 312, memory 314, communication interface 316, or transmit queue manager 318 can, for example, provide means for performing the operations illustrated in and described with respect to FIG. 7.

Operation 700 can include the communication device 102 adding an ACK packet to the transmit queue. Operation 710 can include the communication device 102 starting a timer in response to the ACK packet being added to the transmit queue in operation 700. In this regard, operation 710 can correspond to an embodiment of operation 500 in which a timer can be used to monitor a status of the transmit queue. In some example embodiments, a timer can be set for each ACK added to the transmit queue. Alternatively, in some embodiments, timers can be set for a subset of ACK packets added to the transmit queue.

Operation 720 can include the communication device 102 determining if the timer has expired prior to the ACK packet that was added to the transmit queue in operation 700 being sent. In this regard, operation 720 can correspond to an embodiment of 510 in which expiration of a timer prior to a corresponding ACK packet being sent can be considered to be a queue condition indicative of congestion delaying sending the ACK packet. If the timer has not expired and/or if the ACK packet is sent prior to the timer expiring, the communication device 102 can return to the start of the method and can restart with operation 700, if there is a new ACK packet to be added to the transmit queue.

If, however, it is determined in operation 720, that the timer has expired prior to the ACK packet being sent, the method can proceed to operation 730, which can include the communication device 102 discarding a set of one or more ACK packets from the transmit queue. The discarded set of one or more ACK packets can include one or more oldest ACK packets of the plurality of ACK packets pending in the transmit queue. A most recent ACK packet of the plurality of ACK packets that were pending in the transmit queue can remain pending in the transmit queue after performance of operation 730.

Subsequent to performance of operation 730, the method can return to the start of the method in accordance with some example embodiments. In this regard, the method can, for example, continue to be performed for the duration of a communication session in which the communication device 102 is sending ACK packets to acknowledge receipt of data.

In some example embodiments, the techniques performed in the method of FIG. 6 and the method of FIG. 7 can be performed concurrently. In this regard, some example embodiments can use both a threshold limit on a number of ACK packets in a transmit queue and one or more timers to detect congestion and manage ACK packets pending in the transmit queue.

In some example embodiments, the techniques disclosed herein for managing pending ACK packets, such as the methods illustrated in and described with respect to FIGS. 5-7 can be selectively applied depending on characteristics of a network connection used by the communication device 102 to connect to the network 104. For example, in some embodiments, one or more of the methods illustrated in and described with respect to FIGS. 5-7 can be applied if there is an imbalance between bandwidth available to receive data from the network 104 and bandwidth available to send data to the network 104 such that the bandwidth available to send data to the network 104 is less than the bandwidth available to receive data from the network 104. For example, in instances in which the communication device 102 is connected to a cellular or other wireless network and UL bandwidth is less than DL bandwidth, the communication device 102 can monitor the transmit queue for a queue condition indicative of congestion and can selectively discard one or more pending ACK packets when such a condition is detected in accordance with one or more embodiments described above. However, if the UL bandwidth is the same as the DL bandwidth, or is at least determined to be sufficient to send ACK packets and any other data being uploaded to the network without suffering from congestion, the communication device 102 of some such example embodiments can omit performance of one or more methods disclosed herein monitoring transmit queue status and managing pending ACK packets.

Similarly, in some example embodiments the communication device 102 can be configured to selectively apply disclosed techniques for monitoring transmit queue status and managing pending ACK packets depending on a network access technology used for the connection between the communication device 102 and the network 104. For example, in some embodiments, if the communication device 102 is connected to the network 104 via a cellular RAT, such as TD-SCDMA or EDGE, that provides significantly less bandwidth available for UL communication than for DL communication, the communication device 102 can be configured to apply one or more disclosed techniques or monitoring transmit queue status and managing pending ACK packets, such as one or more of the methods illustrated in and described with respect to FIGS. 5-7. If, however, the communication device 102 is connected to the network 104 via a cellular RAT, such as Long Term Evolution (LTE), which provides sufficient bandwidth for UL communication, the communication device 102 can omit performance of one or more disclosed techniques for monitoring transmit queue status and managing pending ACK packets.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A wireless communication device comprising:
    a communication interface configured to send data to a cellular network on an uplink and to receive data from the cellular network on a downlink; and
    processing circuitry coupled to the communication interface, the processing circuitry configured to control the wireless communication device to at least:
        monitor a status of a transmit queue for packets to be sent on the uplink, at least in part, by:
            maintaining at least one timer for one or more transmission control protocol (TCP) acknowledgement (ACK) packets pending in the transmit queue,
            setting a timer in the at least one timer in response to a particular TCP ACK packet of the one or more TCP ACK packets being added to the transmit queue, and
            detecting a queue condition indicative of uplink congestion when the timer corresponding to the particular TCP ACK packet expires prior to the particular TCP ACK packet being sent to the cellular network on the uplink;
        and
        discard a set of one or more TCP ACK packets from the transmit queue in response to the queue condition;
    wherein a most recent TCP ACK packet pending in the transmit queue is not included in the set of one or more TCP ACK packets and remains pending in the transmit queue after the set of one or more TCP ACK packets has been discarded.

2. The wireless communication device of claim 1, wherein the processing circuitry is further configured to control the wireless communication device to:
    monitor the status of the transmit queue, at least in part, by monitoring a number of TCP ACK packets pending in the transmit queue; and
    detect the queue condition indicative of uplink congestion when the number of TCP ACK packets pending in the transmit queue reaches a predefined threshold limit.

3. The wireless communication device of claim 1, wherein the most recent TCP ACK packet cumulatively acknowledges receipt of each packet acknowledged by the discarded set of one or more TCP ACK packets.

4. The wireless communication device of claim 1, wherein a bandwidth available on the downlink is greater than a bandwidth available on the uplink.

5. The wireless communication device of claim 1, wherein the cellular network is a Time Division Synchronous Code Division Multiple Access (TD-SCDMA) network.

6. The wireless communication device of claim 1, wherein the cellular network is an Enhanced Data rates for Global System for Mobile Communications (GSM) Evolution (EDGE) network.

7. The wireless communication device of claim 1, wherein the transmit queue is utilized by two or more links, and wherein the at least one timer includes two or more timers, each timer in the two or more timers corresponding to a different subset of one or more TCP ACK packets in the transmit queue corresponding to a particular link of the two or more links.

8. A method for managing pending acknowledgement (ACK) packets in a communication device, the method comprising the communication device:
    monitoring a status of a transmit queue for packets to be sent over a network, at least in part, by:
        maintaining at least one timer for one or more ACK packets pending in the transmit queue,
        setting a timer in the at least one timer in response to a particular ACK packet of the one or more ACK packets being added to the transmit queue, and
        detecting a queue condition indicative of uplink congestion when the timer corresponding to the particular ACK packet expires prior to the particular ACK packet being sent over the network;
    and
    discarding a set of one or more ACK packets from the transmit queue in response to the queue condition;
    wherein a most recent ACK packet pending in the transmit queue is not included in the set of one or more ACK packets and remains pending in the transmit queue after the set of one or more ACK packets has been discarded.

9. The method of claim 8, wherein:
    monitoring the status of the transmit queue further comprises monitoring a number of ACK packets pending in the transmit queue; and
    detecting the queue condition indicative of congestion when the number of ACK packets pending in the transmit queue reaches a predefined threshold limit.

10. The method of claim 8, wherein the most recent ACK packet cumulatively acknowledges receipt of each packet acknowledged by the discarded set of one or more ACK packets.

11. The method of claim 8, wherein the one or more ACK packets are transmission control protocol (TCP) ACK packets.

12. The method of claim 8, wherein the network is a wireless network.

13. The method of claim 12, wherein a bandwidth available on a downlink connection between the communication device and the wireless network is greater than a bandwidth available on an uplink connection between the communication device and the wireless network.

14. The method of claim 12, wherein the wireless network is a cellular network.

15. The method of claim 14, wherein the cellular network is a Time Division Synchronous Code Division Multiple Access (TD-SCDMA) network.

16. The method of claim 14, wherein the cellular network is an Enhanced Data rates for Global System for Mobile Communications (GSM) Evolution (EDGE) network.

17. The method of claim 8, wherein the transmit queue is utilized by two or more links, and wherein the at least one timer includes two or more timers, each timer in the two or more timers corresponding to a different subset of one or more ACK packets in the transmit queue corresponding to a particular link of the two or more links.

18. A non-transitory computer readable storage medium having computer program code for managing pending acknowledgement (ACK) packets in a communication device stored thereon, the computer program code, when executed by one or more processors of the communication device, cause the communication device to:
monitor a status of a transmit queue for packets to be sent over a network, at least in part, by:
maintaining at least one timer for one or more acknowledgement (ACK) packets pending in the transmit queue,
setting a timer in the at least one timer in response to a particular ACK packet of the one or more ACK packets being added to the transmit queue, and
detecting a queue condition indicative of uplink congestion when the timer corresponding to the particular ACK packet expires prior to the particular ACK packet being sent over the network;
and
discard a set of one or more ACK packets from the transmit queue in response to the queue condition;
wherein a most recent ACK packet pending in the transmit queue is not included in the set of one or more ACK packets and remains pending in the transmit queue after the set of one or more ACK packets has been discarded.

19. The non-transitory computer readable storage medium of claim 18, wherein execution of the computer program code causes the communication device to:
monitor a number of ACK packets pending in the transmit queue; and
detect the queue condition indicative of congestion when the number of ACK packets pending in the transmit queue reaches a predefined threshold limit.

20. The non-transitory computer readable storage medium of claim 18, wherein the transmit queue is utilized by two or more links, and wherein the at least one timer includes two or more timers, each timer in the two or more timers corresponding to a different subset of one or more ACK packets in the transmit queue corresponding to a particular link of the two or more links.

* * * * *